(12) United States Patent
Curtis

(10) Patent No.: US 11,696,526 B2
(45) Date of Patent: Jul. 11, 2023

(54) AUTONOMOUS MOWER WITH ADJUSTABLE CUTTING HEIGHT

(71) Applicant: THE TORO COMPANY, Bloomington, MN (US)

(72) Inventor: Aaron Y. Curtis, Eagan, MN (US)

(73) Assignee: THE TORO COMPANY, Bloomington, MN (US)

( * ) Notice: Subject to any disclaimer, the term of this patent is extended or adjusted under 35 U.S.C. 154(b) by 734 days.

(21) Appl. No.: 16/696,763

(22) Filed: Nov. 26, 2019

(65) Prior Publication Data
US 2020/0170186 A1 Jun. 4, 2020

Related U.S. Application Data

(60) Provisional application No. 62/774,383, filed on Dec. 3, 2018.

(51) Int. Cl.
| | | |
|---|---|---|
| A01D 34/74 | (2006.01) | |
| A01D 34/00 | (2006.01) | |
| F16H 25/20 | (2006.01) | |
| A01D 34/64 | (2006.01) | |
| A01D 101/00 | (2006.01) | |

(52) U.S. Cl.
CPC ........... *A01D 34/74* (2013.01); *A01D 34/008* (2013.01); *A01D 34/64* (2013.01); *F16H 25/20* (2013.01); *A01D 2101/00* (2013.01)

(58) Field of Classification Search
CPC ...... A01D 34/74; A01D 34/008; A01D 34/64; A01D 2101/00; F16H 25/20; F16H 25/24
See application file for complete search history.

(56) References Cited

U.S. PATENT DOCUMENTS

| | | | |
|---|---|---|---|
| 2,405,307 A | 8/1946 | Hutter | |
| 3,114,229 A | 12/1963 | Floyd | |
| 4,479,346 A | 10/1984 | Chandler | |
| 5,203,151 A | 4/1993 | Mills | |
| 7,707,812 B2 | 5/2010 | Cheung | |
| 8,234,848 B2 | 8/2012 | Messina et al. | |
| 9,357,699 B2 * | 6/2016 | Elonsson | F16H 25/24 |
| 10,104,837 B2 | 10/2018 | Hashimoto et al. | |
| 2007/0234698 A1 | 10/2007 | Silbernagel et al. | |

(Continued)

FOREIGN PATENT DOCUMENTS

| | | |
|---|---|---|
| CN | 101982037 | 3/2011 |
| CN | 201797741 | 4/2011 |

(Continued)

*Primary Examiner* — Joseph H Feild
*Assistant Examiner* — Rufus C Point
(74) *Attorney, Agent, or Firm* — Mueting Raasch Group

(57) ABSTRACT

An autonomous vehicle (e.g., mower) includes two or more wheels supporting a chassis upon a ground surface. A cutting motor powers at least one cutting blade, and a cutting frame supports the cutting motor relative to the chassis. The cutting frame is movable, relative to the chassis, to allow adjustment of a height-of-cut of the cutting blade relative to the ground surface. First and second guide rods are operatively attached to the chassis and are received within corresponding first and second apertures of the cutting frame to guide movement of the cutting frame. Biased bearings associated with the cutting frame may bias associated bearing members against the guide rods.

21 Claims, 16 Drawing Sheets

(56) References Cited

U.S. PATENT DOCUMENTS

| | | | | |
|---|---|---|---|---|
| 2011/0166701 A1* | 7/2011 | Thacher | ............ | A01G 25/00 |
| | | | | 700/245 |
| 2017/0181375 A1* | 6/2017 | Hashimoto | ............ | A01D 34/74 |
| 2018/0206402 A1 | 7/2018 | Ran et al. | | |
| 2019/0307060 A1* | 10/2019 | Hong | ............ | A01D 34/81 |

FOREIGN PATENT DOCUMENTS

| | | | |
|---|---|---|---|
| CN | 107836200 A | * | 3/2018 |
| CN | 107873226 A | * | 4/2018 |
| EP | 0634091 | | 1/1995 |
| EP | 1495661 | | 1/2005 |
| EP | 2422602 | | 2/2012 |
| EP | 2425701 | | 3/2012 |
| EP | 2783563 | | 10/2014 |
| EP | 3295781 | | 3/2018 |
| GB | 2481108 | | 12/2011 |
| KR | 200248411 Y1 | * | 10/2001 |

\* cited by examiner

AUTONOMOUS MOWER WITH ADJUSTABLE CUTTING HEIGHT

This application claims the benefit of U.S. Provisional Application No. 62/774,383, filed Dec. 3, 2018, the disclosure of which is incorporated by reference herein in its entirety.

The present disclosure relates to autonomous ground working vehicles (e.g., lawn mowers) and, more particularly, to systems and methods for adjusting a height of a tool carried by the vehicle (e.g., a cutting blade).

BACKGROUND

Lawn and garden machines are known for performing a variety of tasks. For instance, powered lawn mowers are used by both homeowners and professionals alike to maintain turf areas within a property or yard.

Mowers that autonomously perform a grass cutting function are also known. Autonomous mowers typically include a deck or housing supporting one or more cutting blades. Battery-powered electric motors may be included to power both the cutting blade(s) and a propulsion system.

As with conventional mowers, it may be beneficial to adjust the height of cut provided by the mower. For example, lawn conditions and/or homeowner preferences may benefit from cutting the grass at one of several different heights. While manual adjustment is common in conventional lawn mowers, such manual interaction may be undesirable for some autonomous mowers.

SUMMARY

Embodiments described herein may provide an autonomous ground working vehicle having one or more of: a chassis; two or more wheels supporting the chassis upon a ground surface; a tool motor adapted to power at least one ground working tool, the tool motor driving an output shaft defining a motor axis extending along a first direction; a frame operatively supporting the tool relative to the chassis, wherein the frame is movable, relative to the chassis, to allow adjustment of a height of the tool relative to the ground surface; parallel first and second guide rods operatively attached to the chassis and extending parallel to the first direction, wherein the first and second guide rods are received within corresponding first and second apertures of the frame to guide movement of the frame during height adjustment of the tool; a rotatable drive screw operatively connected to the chassis and defining a screw axis extending parallel to the first direction, the drive screw comprising a helical external thread; a driven member operatively connected to the frame and including a helical internal thread adapted to threadably receive the external thread of the drive screw; and a biasing member associated with the frame and adapted to bias a bearing associated with the frame directly against the first guide rod. One or more aspects may be additionally included, in any combination, to produce other embodiments. For example, the biasing member may include a first spring, and the vehicle may include a second spring adapted to bias a second bearing associated with the frame directly against the second guide rod. In another aspect, a height adjustment motor is provided and adapted to rotate the drive screw. In yet another aspect, the driven member comprises two semi-cylindrical threaded halves adapted to engage one another to form a cylindrical nut. In still another aspect, the driven member is received by the frame. In still yet another aspect, the frame defines a receiver having a flange, wherein the flange is adapted to engage a groove formed on one or more sides of the driven member when the driven member is received by the frame. In another aspect, a third guide rod is operatively attached to the chassis and extends parallel to the first direction, wherein the third guide rod is received within a third aperture of the frame. In yet another aspect, the tool motor is directly supported by the frame. In still another aspect, a height adjustment manual turn screw is provided and adapted to rotate the drive screw.

In other embodiments, an autonomous lawn mower is provided that includes one or more of a chassis; two or more wheels supporting the chassis upon a ground surface; a cutting motor adapted to power a rotating cutting blade, the cutting motor comprising an output shaft defining a motor axis extending vertically; a cutting frame operatively supporting the cutting motor relative to the chassis, wherein the cutting frame is adapted to move, relative to the chassis, to allow adjustment of a height of the cutting blade relative to the ground surface; parallel first and second guide rods operatively attached to the chassis and extending vertically, wherein the first and second guide rods are received within corresponding first and second apertures of the cutting frame such that the guide rods guide movement of the cutting frame during adjustment of the height of the cutting blade; a rotatable drive screw operatively connected to the chassis and defining a screw axis parallel to the first and second guide rods, the drive screw defining an external thread; a driven member including an internal thread adapted to threadably engage the external thread of the drive screw, wherein the driven member is operatively attached to the cutting frame; and a first spring-biased bearing associated with the cutting frame and biased against the first guide rod, wherein the first spring-biased bearing is adapted to generate a first biasing force between the cutting frame and the first guide rod. One or more aspects may be additionally included, in any combination, to produce other embodiments. For example, a second spring-biased bearing associated with the cutting frame may be provided and biased against the second guide rod, wherein the second spring-biased bearing is adapted to generate a second biasing force between the cutting frame and the second guide rod. In another aspect, a height-of-cut (HOC) motor is provided and adapted to selectively rotate the drive screw. In yet another aspect, the HOC motor is attached to the chassis and comprises a pinion gear adapted to engage a driven gear attached to the drive screw. In still yet another aspect, a sensor is provided and adapted to detect a height-of-cut position of the cutting blade. In yet another aspect, the drive screw includes one or more targets positioned along an outer surface of the drive screw, and the sensor is adapted to detect passage of the one or more targets. In another aspect, a third guide rod is operatively attached to the chassis and extends vertically, wherein the third guide rod is received within a third aperture of the cutting frame. In still another aspect, a controller is included, wherein the controller is adapted to control rotation of the drive screw to adjust a height-of-cut of the cutting blade relative to the ground surface in response to a signal received by the controller. In yet another aspect, the signal includes a signal from a sensor in communication with the controller. In yet still another aspect, the sensor includes a sensor selected from the group consisting of a grass height sensor, a moisture sensor, and a cutting motor load sensor, while in another aspect the signal comprises a calendar date. In still another aspect, a controller and a radio are included, wherein the radio is adapted to communicate with a remote computer, and the controller is adapted to control rotation of the rotatable drive screw to adjust a height-of-cut of the cutting blade relative to the ground surface in response to the radio receiving a command from the remote computer.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
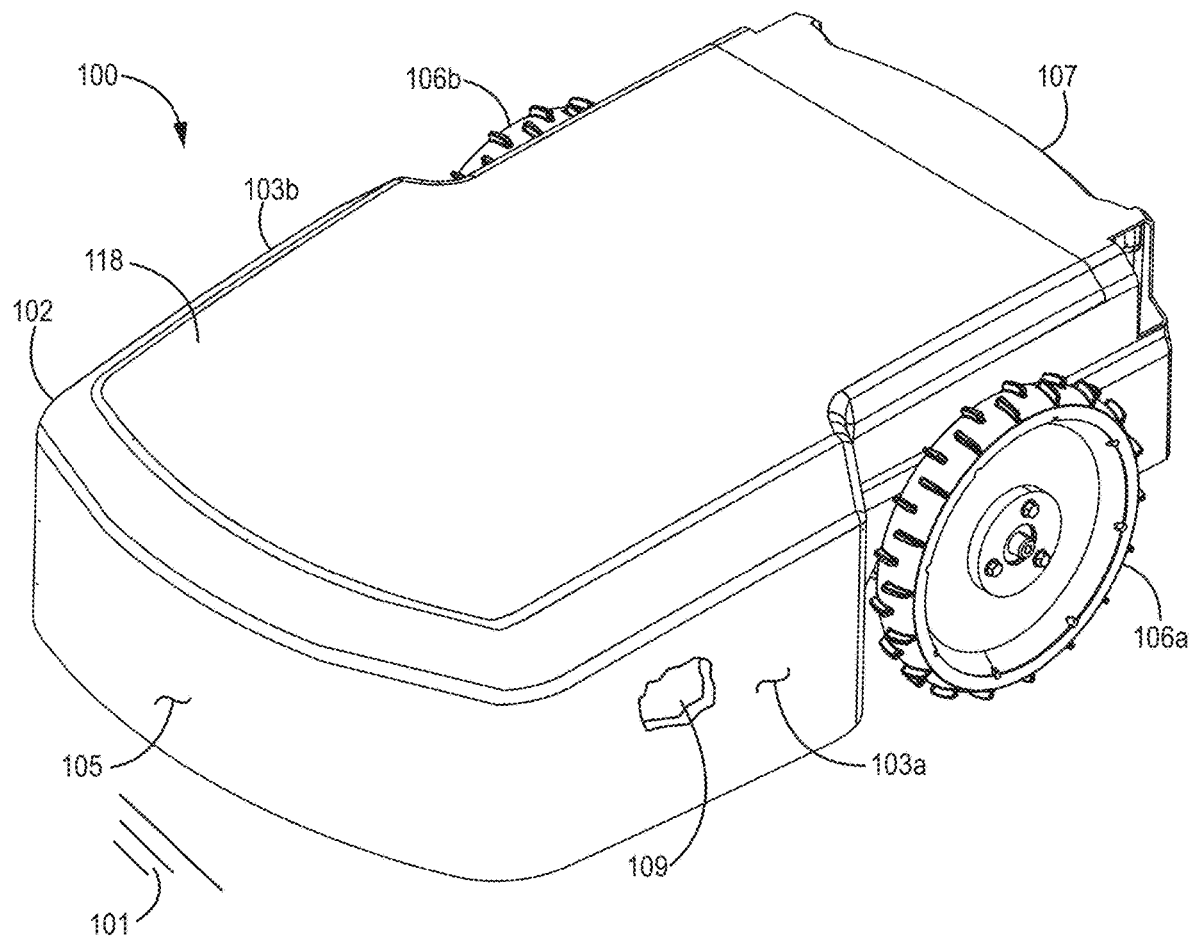
FIG. 1 is a front perspective view of an autonomous ground working vehicle (e.g., lawn mower) in accordance with one embodiment of this disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." Further, the term "and/or" (if used) means one or all of the listed elements or a combination of any two or more of the listed elements. Still further, "i.e." may be used herein as an abbreviation for the Latin phrase id est, and means "that is," while "e.g.," may be used as an abbreviation for the Latin phrase exempli gratia, and means "for example."

Embodiments of the present disclosure are directed to autonomous ground working machines or vehicles and to methods of operating the same within a predefined work region (e.g., a turf area of a residential or commercial property). Such vehicles may include a tool and may operate the tool autonomously within the work region. For example, the vehicle may be configured as an autonomous lawn mower adapted to cut grass as the mower travels over the work region. Vehicles in accordance with embodiments of the present disclosure may thus include a tool (e.g., cutting blade) control system formed by a tool (e.g., blade) drive system and a tool (e.g., blade) height adjustment (e.g., height-of-cut (HOC)) control system. The HOC control system may allow the mower to automatically change the height of cut grass, and/or may permit the operator to adjust the height of cut via commands issued from a remote computer (e.g., desktop computer, tablet, smart phone) or dedicated local (attached to the mower) interface. Moreover, HOC control systems in accordance with embodiments of the present disclosure may be manufactured in a cost-effective manner while still providing consistent transition between different heights-of-cut (i.e., height-of-cut changes may occur with little or minimal binding or chatter).

While the "tool" is described herein as cutting blade for a lawn mower, such a configuration is exemplary only as systems and methods described herein may also find application to other autonomously operated vehicles incorporating other tools including, for example, commercial turf products, other ground working vehicles (e.g., debris blowers/vacuums, aerators, material spreaders, snow throwers), as well as indoor working vehicles such as vacuums and floor scrubbers/cleaners.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the vehicle (e.g., mower 100) is operating upon a ground surface 101 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

Figure 2:
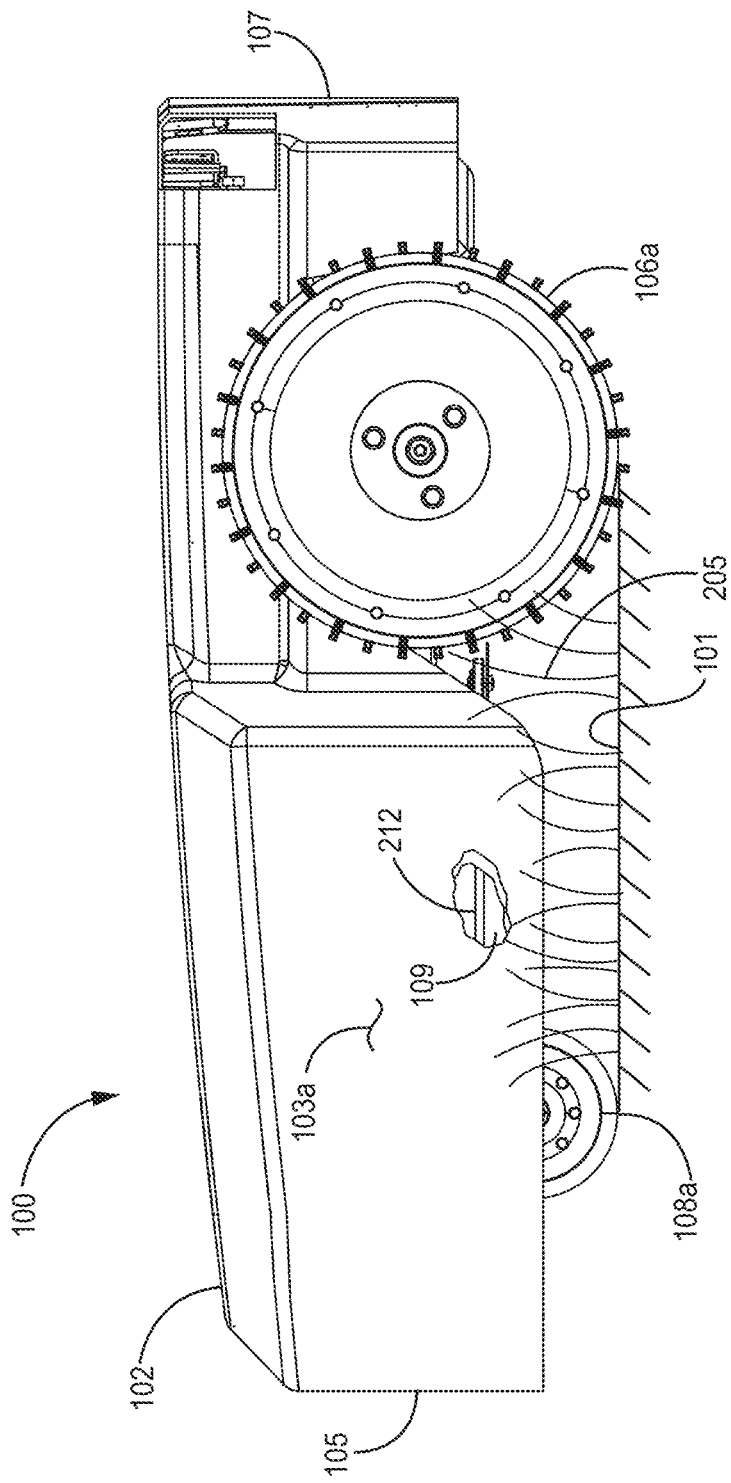
FIG. 2 is a side elevation view of the mower of FIG. 1.

FIGS. 1 and 2 illustrate a perspective view and side elevation view, respectively, of an exemplary working vehicle, e.g., autonomous lawn mower 100, in accordance with embodiments of the present disclosure. The mower 100 may include a cutting housing or deck 102 (including a chassis 110; see FIG. 3A) supported in rolling engagement upon a ground surface 101 by two or more ground-engaging wheels. For example, rear wheels 106 (e.g., rear wheels 106a, 106b) and front wheels 108 (e.g., front wheels 108a, 108b; only wheel 108a visible in FIG. 2, but see FIG. 3A) may be attached, respectively, at or near the rear and front sides of the deck 102 as shown. The wheels may rotate, relative to the deck 102, as the deck moves over the ground surface 101. Some of the wheels may be powered to propel the mower during operation. For example, the rear wheels 106 may be independently driven in forward and reverse directions, while the front wheels may passively caster. As a result, differential rotation of the rear wheels 106 may affect both forward and reverse propulsion as well as steering of the mower 100.

Figure 3A:
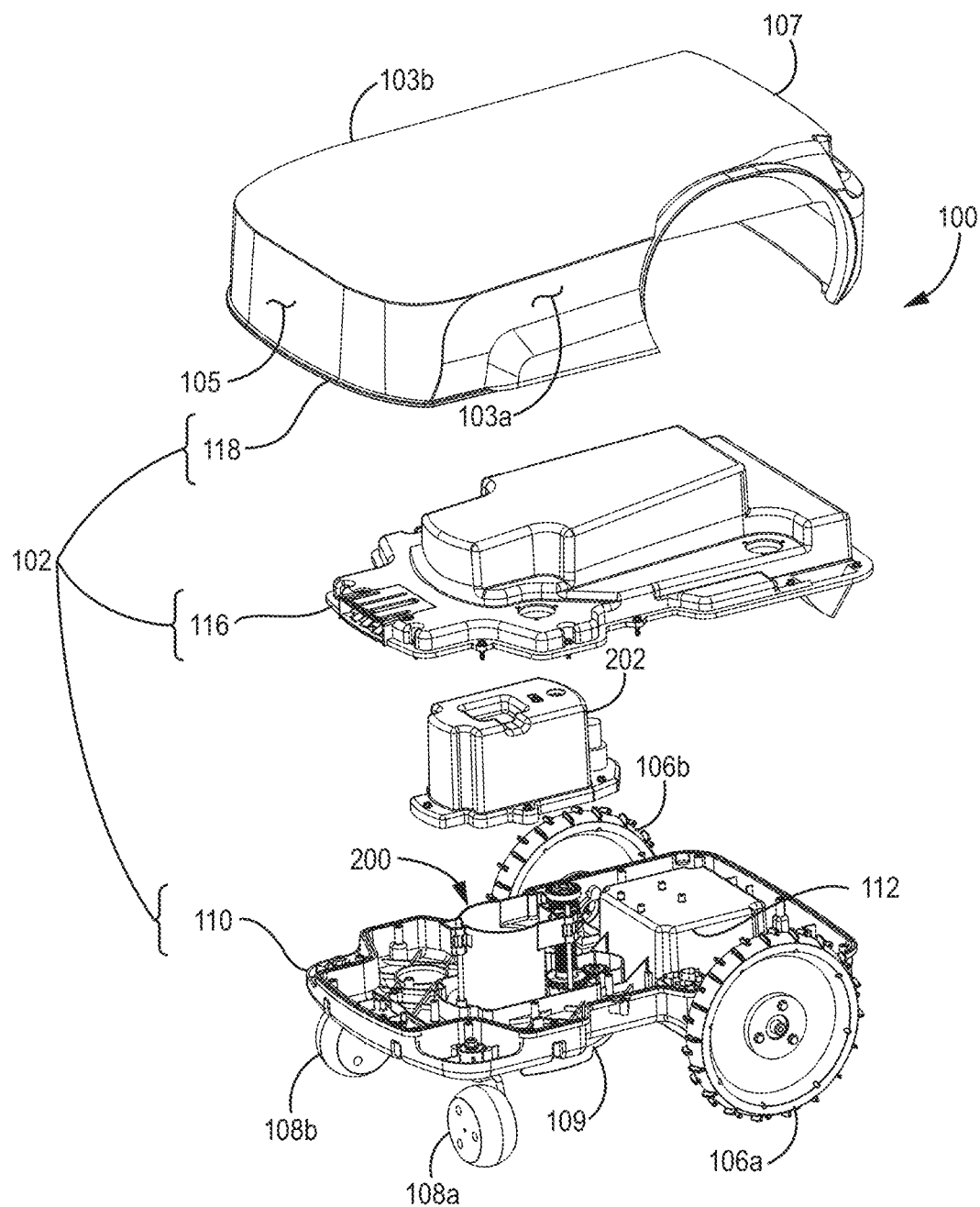
FIG. 3A is an exploded perspective view of an autonomous lawn mower in accordance with one embodiment of this disclosure.
Figure 3B:
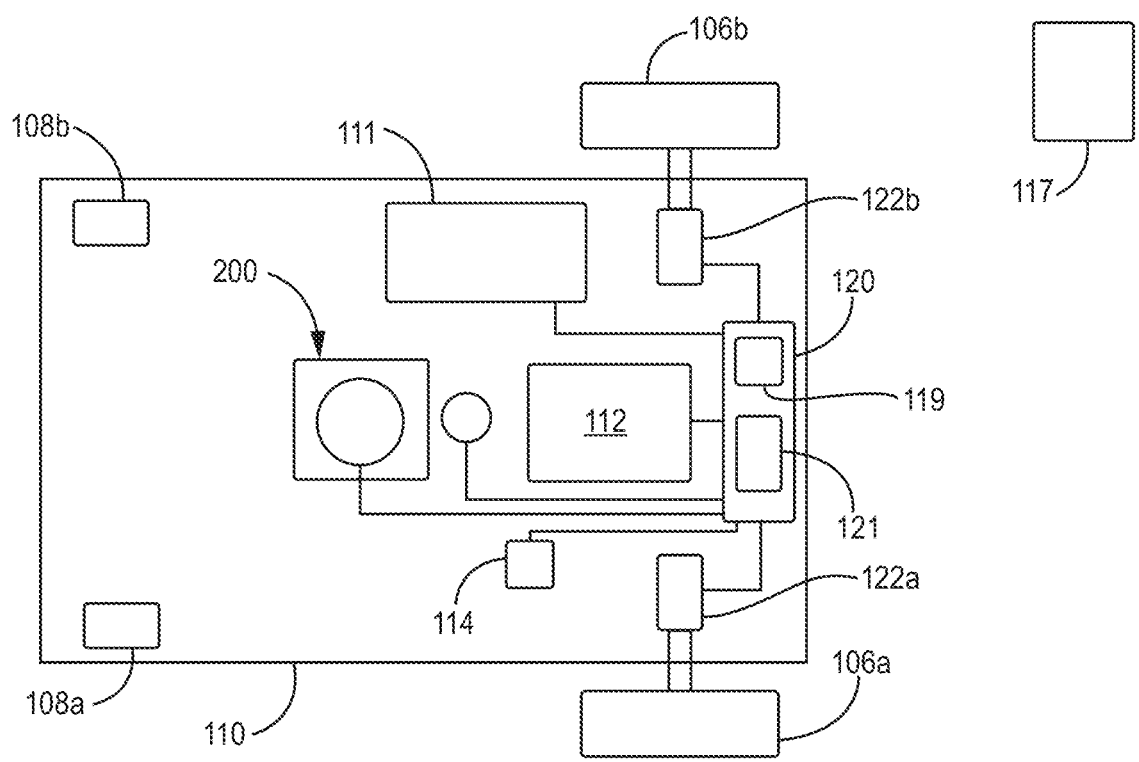
FIG. 3B is a schematic view illustrating different components of the autonomous lawn mower of FIG. 3A.

As shown in FIGS. 3A and 3B, the deck 102 may include a chassis 110 adapted to support various components of the mower. For example, the chassis may support the wheels 106, 108 and corresponding drive wheel motors 122, radio 111, a battery(s) 112, a tool (e.g., blade) control system 200, and a controller 120 among other components. The deck 102 may further include a cover 116 adapted to at least partially seal or otherwise protect various components of the mower and chassis, and a bump shroud 118 that forms an outer body of the mower 100. The blade control system 200 may, in some embodiments, be protected by a cover 202 as shown exploded from the chassis in FIG. 3A.

The bump shroud 118 may form downwardly extending sidewalls (e.g., left and right sidewalls 103 (e.g., left sidewall 103a, right sidewall 103b), front sidewall 105, and rear sidewall 107) that at least partially enclose a cutting chamber 109. In some embodiments, the sidewalls may be used to detect contact of the moving mower 100 with obstacles. Moreover, the left and right sidewalls 103 may extend outwardly to or beyond the rear wheel track width to effectively form trim edges of the mower during operation.

Figure 4:
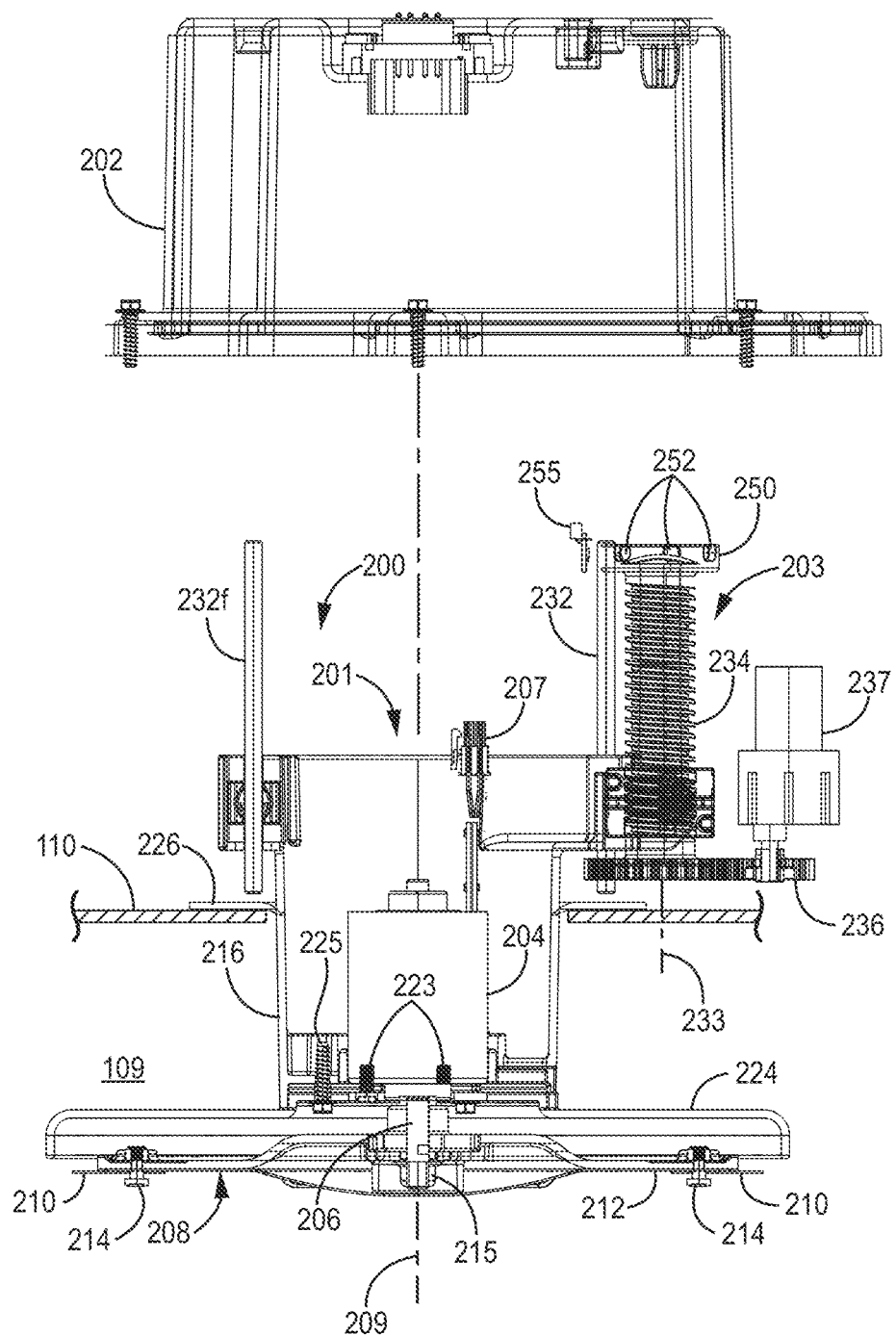
FIG. 4 is an isolated section view of an exemplary tool (e.g., blade) control system (with cover exploded therefrom) isolated from the mower, the tool control system comprising a tool (e.g., blade) drive system and a tool (e.g., blade) height-of-cut (HOC) control system.

The mower 100 (e.g., the blade control system 200) may also include a tool (e.g., cutting blade) motor 204 as shown in the section view of FIG. 4. The motor 204 is adapted to power at least one ground working tool as further described herein. While illustrated herein as an electric motor 204, alternative prime movers, such as internal combustion engines, are also contemplated.

As further shown in FIG. 4, the motor 204 may include an output shaft 206 defining a motor axis 209 that extends along a first direction (e.g., vertically in FIG. 4) through the chassis 110 and into the cutting chamber 109. A ground working tool (e.g., rotatable cutting blade assembly 208) may be attached to a lower end of the shaft 206. The cutting blade assembly 208 may include multiple (e.g., four) cutting blades 210 attached to a disk 212. In some embodiments, each of the cutting blades 210 may be pivotally attached to the disk 212 by a pin or fastener 214. The disk 212 may be attached, directly or indirectly, to the output shaft 206, by a fastener 215.

During operation, the output shaft 206 rotates the cutting blade assembly 208 at a speed sufficient to permit the blades 210 to sever grass 205 (see FIG. 2) and other vegetation over which the deck 102 passes. By pivotally connecting each cutting blade 210 to the rotating disk 212, the cutting blades are capable of incurring blade strikes against various objects (e.g., rocks, tree roots, etc.) without causing excessive damage to the blades 210, blade assembly 208, shaft 206, motor 204, and/or other portions of the mower 100. Moreover, while described herein in the context of one or more cutting "blades," other cutting elements including, for example, conventional mower blades, flexible string or line elements, etc., are certainly possible without departing from the scope of this disclosure.

As stated above, the wheels 106 may be powered (e.g., by separate wheel motors 122; see FIG. 3B) so that the mower 100 is self-propelled. While shown having four wheels, other embodiments may utilize any number of wheels (e.g., two or more). Still further, as used herein, "wheels" may include other ground-engaging members such as tracks, rollers, or skids.

The mower 100 may include one or more sensors (not shown) to assist with localization. For instance, some embodiments may include a global positioning system (GPS) receiver adapted to estimate a position of the mower 100 within the work region and provide such information to the controller 120 (see FIG. 3B). In other embodiments, one or more of the wheels 106, 108 may include encoders (not shown) that provide wheel rotation/speed information that may be used to estimate mower position (e.g., based upon an initial start position) within a given work region. Other sensors (e.g., inertial measurement unit, vision (camera) sensor, infrared sensor, radio detection and ranging (radar) sensor, light detection and ranging (lidar) sensor, etc.) now known or later developed may also be incorporated into the mower 100. The mower 100 may further include sensors adapted to detect a boundary wire when the latter is used to define a boundary of the work region.

The controller 120 (see FIG. 3B) may be adapted to electronically monitor and control various mower functions. An exemplary controller may include a processor 119 that receives various inputs and executes one or more computer programs or applications stored in memory 121. The memory may include computer-readable instructions or applications that, when executed, e.g., by the processor 119, cause the controller to perform various calculations and/or issue commands. That is to say, the processor 119 and memory 121 may together define a computing apparatus operable to process input data and generate the desired output to one or more components/devices. For example, the processor 119 may receive various input data including positional data from the GPS receiver and/or wheel encoders, and generate speed and steering angle commands to drive wheel motors 122 and cause the drive wheels 106 to rotate (at the same or different speeds and in the same or different directions). The controller 120 may further control the blade control system 200 (e.g., both the blade drive system 201 and the HOC control system 203 as described below). In other words, the controller 120 may control the steering angle and speed of the mower 100, as well as the operation and height of the cutting blade assembly 208.

In view of the above, it will be readily apparent that the functionality of the controller 120 may be implemented in any manner known to one skilled in the art. For instance, the memory 121 may include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the controller 120, the memory 121 and the processor 119 could be contained in separate modules.

The processor 119 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 119 may include multiple components, such as any combination of one or more microprocessors, one or more controllers, one or more DSPs, one or more ASICs, and/or one or more FPGAs, as well as other discrete or integrated logic circuitry. The functions attributed to the controller/processor herein may be embodied as software, firmware, hardware, or any combination thereof. In at least one embodiment, various subsystems of the mower 100, as described above, could be connected in most any manner, e.g., directly to one another, wirelessly, via a bus architecture (e.g., controller area network (CAN) bus), or any other connection configuration that permits data and/or power to pass between the various components (e.g., controller, motor 204, HOC control system (e.g., height adjustment or HOC motor 237 as further described below), drive wheel motors 122, GPS, wheel encoders, bump sensors, etc.) of the mower.

Figure 5:
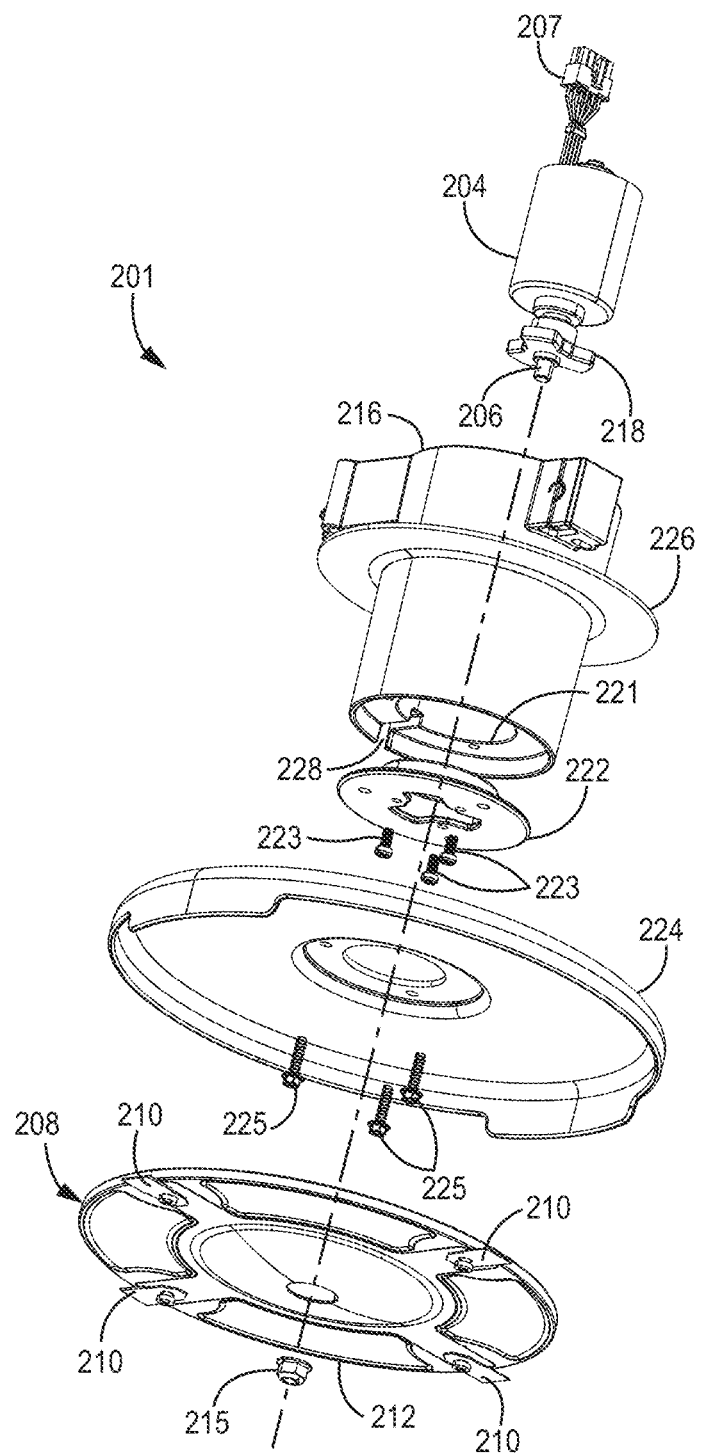
FIG. 5 is an exploded lower perspective view of a blade drive system in accordance with embodiments of the present disclosure.
Figure 6:
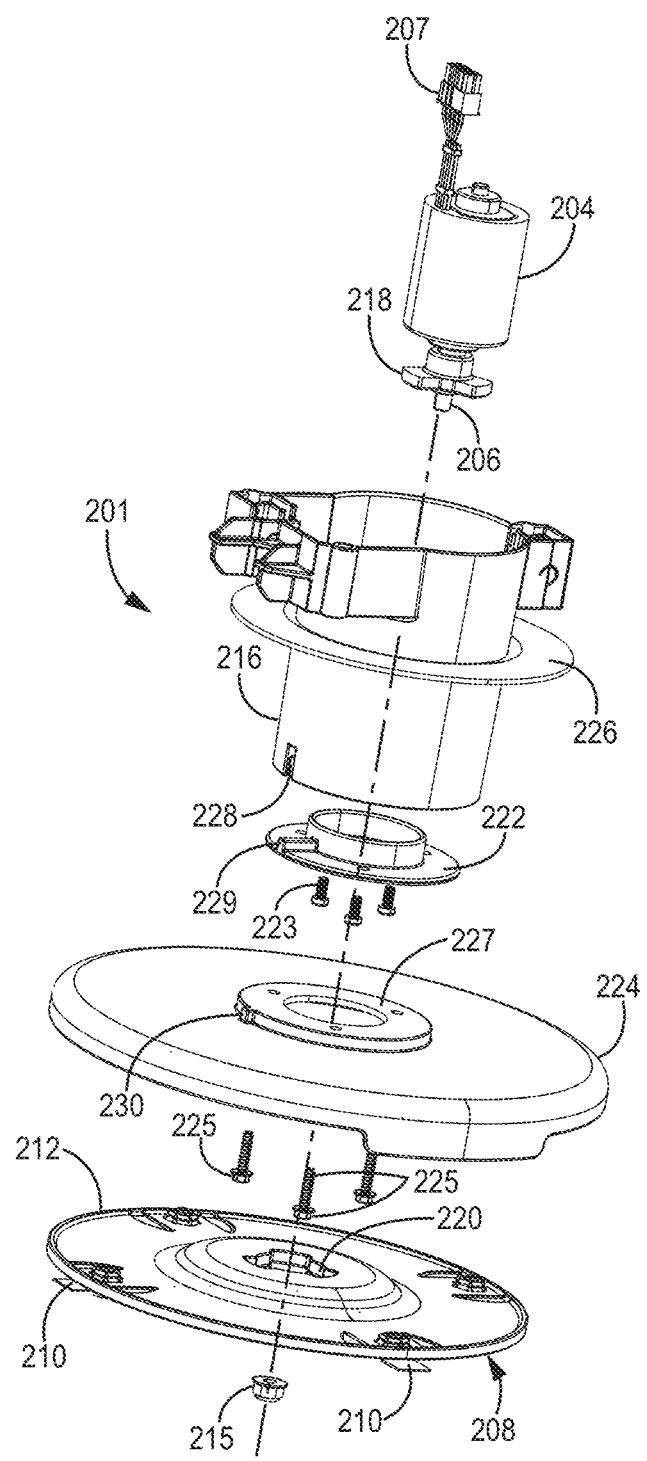
FIG. 6 is an exploded upper perspective view of the blade drive system of FIG. 5.

With reference to FIGS. 4-6, an exemplary blade drive system 201 is now described. The blade drive system 201 in combination with a HOC control system (embodiments of the latter being illustrated in FIGS. 7-13) may together define the blade control system 200.

As shown in the cross-sectional view of FIG. 4, the blade drive system 201 may include a prime mover (e.g., electric motor 204) secured to and directly supported by a frame, e.g., cutting frame 216. The cutting frame 216 is operatively connected to the chassis 110 of the mower and supports a tool (e.g., cutting blade assembly 208) relative to the chassis. As further described below, the cutting frame 216 is movable, relative to the chassis 110, to allow adjustment of a height of the tool (e.g., cutting blade assembly 208) relative to the ground surface 101. The motor 204 may include a wiring harness 207 to provide power from the battery 112 (see FIG. 3B) to the motor to permit rotation of the cutting blade assembly 208 during mower operation. The harness may further permit communication of the motor 204 with the controller 120 (see also FIG. 3B). In some embodiments, the cover 202 may be provided to cover those portions of the tool drive system and HOC control system located above the chassis 110.

FIGS. 5 and 6 illustrate, respectively, an exploded lower perspective view and exploded upper perspective view of one exemplary embodiment of the blade drive system 201 and accompanying structure. As shown in these views, a key 218 may be secured to the output shaft 206 of the electric motor 204 such that the key rotates with the shaft. The key 218 may be received within a keyway 220 (visible in FIG. 6) formed in the disk 212 of the cutting blade assembly 208 to permit transmission of rotational force from the motor to the disk once the blade drive system is assembled.

The electric motor 204 may be received in the frame 216 (e.g., from above) where it may rest upon a flange 221. A retainer plate 222 may be located against a lower side of the flange 221 near a bottom side of the frame 216. Fasteners 223 may pass through the retainer plate 222 and thread into openings (see FIG. 4) in the electric motor 204.

A blade guard 224 may be located such that a face 227 of the blade guard rests against a lower surface of the retainer plate 222. Fasteners 225 may pass with clearance through the blade guard 224 and retainer plate 222 and engage threaded apertures formed in the frame 216 (see FIG. 4). Finally, the cutting blade assembly 208 may be positioned such that the key 218 is received within the keyway 220 of the disk 212, wherein the cutting blade assembly is secured in place with the fastener 215 threadably engaged with the output shaft 206 of the electric motor 204. In order to ensure the components of the blade drive system 201 are correctly aligned, some embodiments of the frame 216 may include a notch 228 adapted to receive tabs 229 and 230 (see FIG. 6) of the retainer plate 222 and the blade guard 224, respectively (see also FIG. 7).

To minimize debris/moisture ingress from the cutting chamber 109 (see FIG. 4) into the area above the chassis 110, a seal 226 may optionally be provided. While various configurations are certainly possible, the seal 226 may be a flexible (rubber) annular lip seal that is attached (e.g., fastened, adhered, etc.) to the chassis 110 to engage the frame 216 with interference to form a relatively tight seal with the frame as the latter moves relative to the chassis as explained in more detail below.

As stated above, the blade control system 200 may also include the HOC control system 203 as shown in FIGS. 4 and 7-13. The HOC control system 203 may be used to adjust the relative height of the cutting blades 210 (e.g., of the disk 212) relative to the chassis 110/ground surface 101 (see FIG. 2) to allow corresponding variation in the height of cut grass 205.

Figure 7:
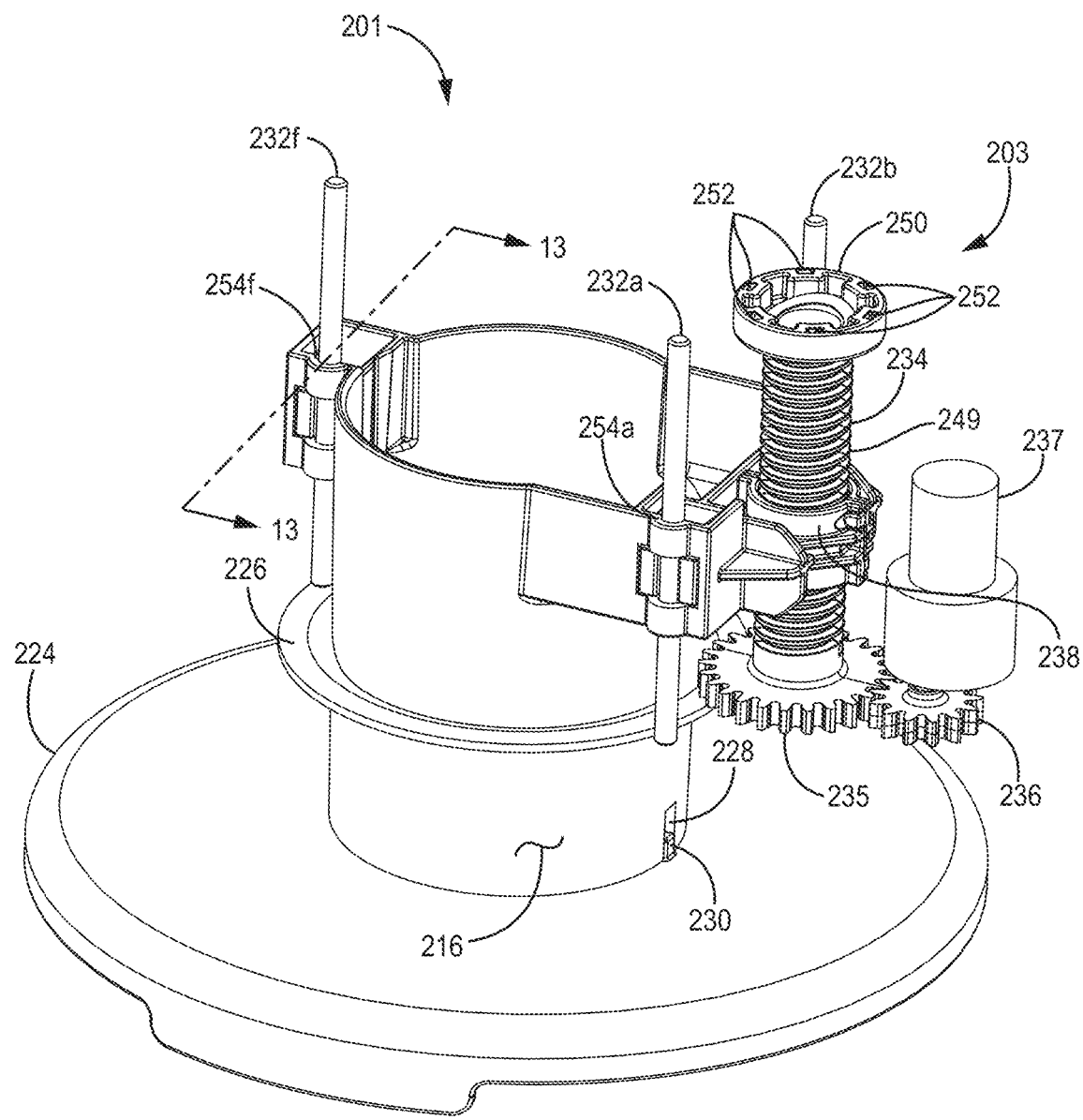
FIG. 7 is an upper perspective view of a HOC control system in accordance with embodiments of the present disclosure.

With reference first to FIG. 7, the exemplary HOC control system 203 may include two or more parallel guide rods 232 having their respective lower ends operatively attached or otherwise fixed to the chassis 110 of the mower (attachment to the chassis not shown in the figures, but could be via most any acceptable method including, for example, press-fit into apertures in the chassis). For instance, the system 203 may include two (e.g., first and second) guides rods 232a, 232b, at or near a rear portion of the frame 216, and a third guide rod 232f (reference numeral "232" may hereinafter refer to one or more of the guide rods 232a, 232b, and 232f) at or near a front portion of the frame 216. While shown as using three guide rods, such a configuration is exemplary only as embodiments having more or less guide rods in most any relative positions are contemplated within the scope of this disclosure. The guide rods 232 may, in the illustrated embodiment, extend parallel to the first (e.g., vertical) direction.

The HOC control system may further include a drive member, e.g., rotatable drive screw 234, operatively connected to the chassis 110 and defining a screw axis 233 (FIG. 4) that extends parallel to the first (vertical) direction. For instance, the drive screw 234 may be journalled to the chassis 110 such that it is constrained primarily to rotational movement. A driven gear 235 is connected to the drive screw 234 (e.g., near the lower end of the drive screw). The gear 235 may mesh with a pinion 236 attached to an output shaft of a HOC motor 237 that is attached to the chassis and adapted to rotate the drive screw. That is, selective rotation of the pinion 236 (via energizing of the motor 237) will cause the gear 235, and thus the drive screw 234) to rotate. The direction of rotation of the motor 237 may be controlled to correspondingly change the direction of rotation of the drive screw 234.

The HOC control system 203 may further include a driven member operatively connected to the frame 216. In some embodiments, the driven member may be configured as a split nut 238 as illustrated (prior to assembly) in FIG. 8.

Figure 8:
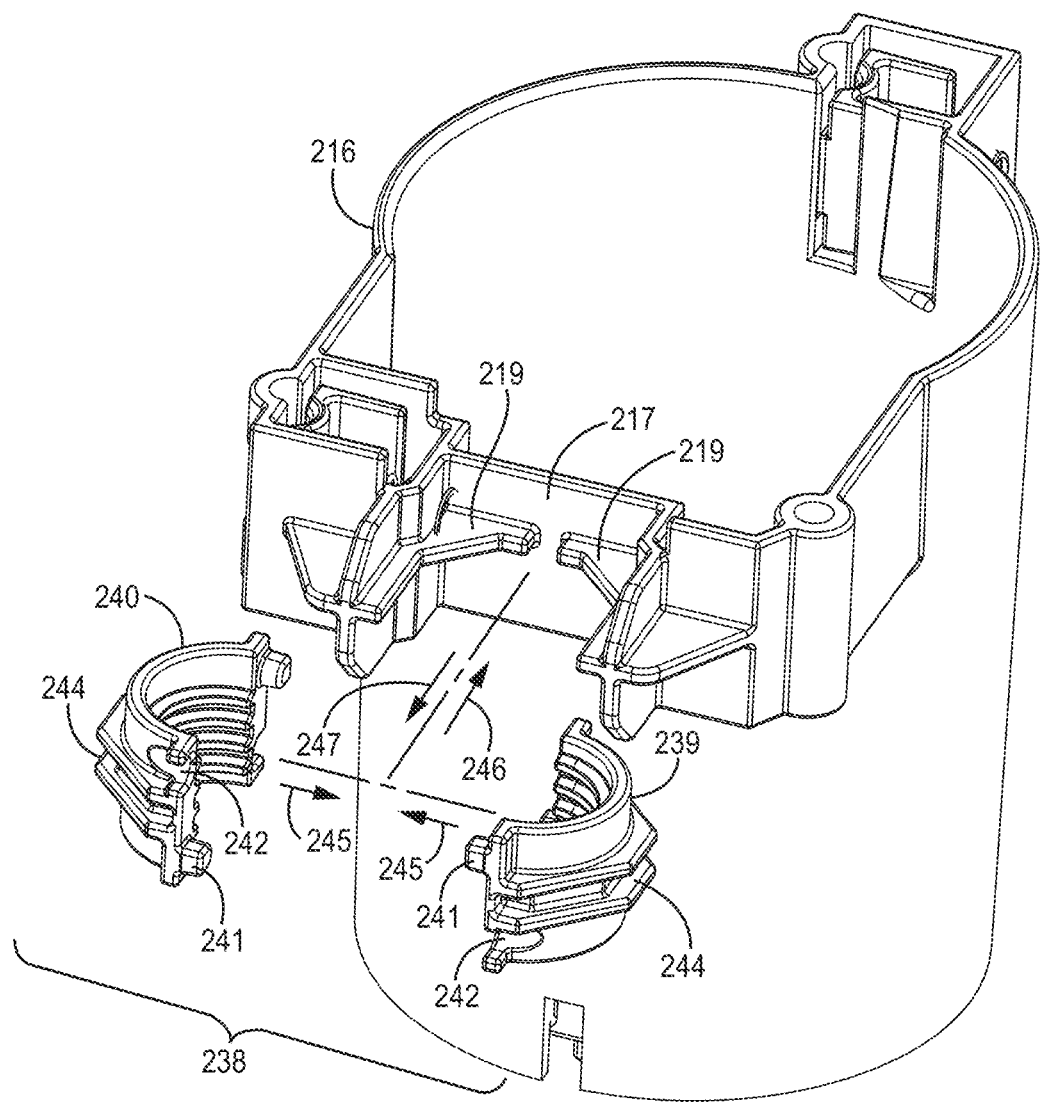
FIG. 8 is an exploded view of a portion of the HOC control system of FIG. 7.
Figure 9:
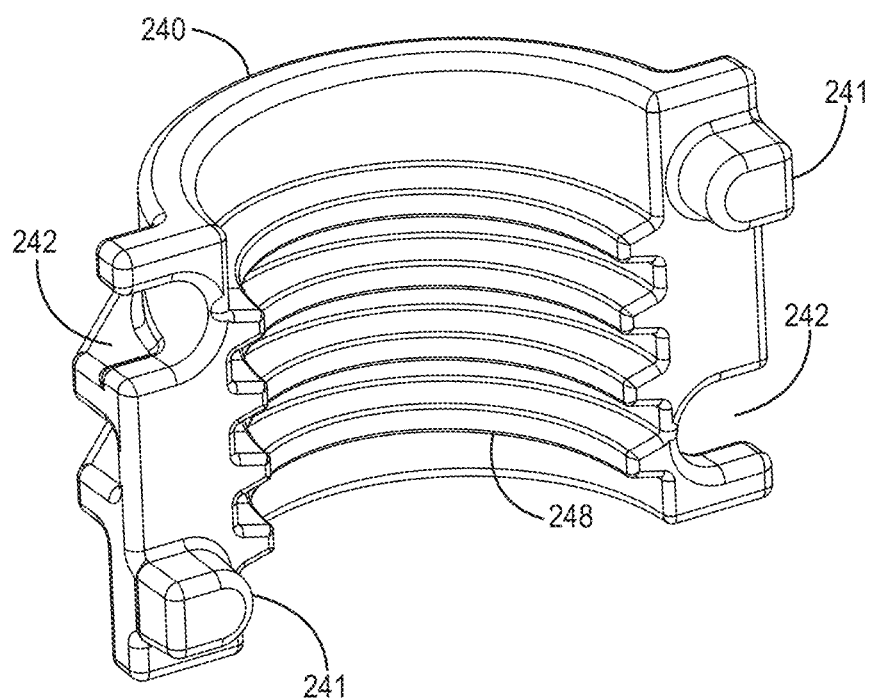
FIG. 9 is an isolated perspective view of a portion of a driven member (e.g., split nut) of the HOC control system of FIG. 8.

The cylindrical nut 238 may comprise two semi-cylindrical threaded halves 239 and 240, the latter illustrated in isolation in FIG. 9. To accommodate securement of the two halves 239 and 240 to one another, each may include mating faces that define one or both of protrusions 241 and apertures 242. For example, in the illustrated embodiments, each half 239, 240 includes two mating faces, wherein each mating face includes a protrusion 241 and an opening 242. The protrusions 241 of the half 239 are adapted to engage the corresponding apertures 242 of the half 240 and vice versa as the two halves are joined (moved in the direction 245 shown in FIG. 8). In some embodiments, engagement of each protrusion 241 with its corresponding opening 242 may be via an interference fit. Once the two halves 239, 240 are assembled, a continuous female (internal) thread 248 is formed on an inner surface (see FIG. 9) of the nut 238.

As indicated in FIG. 8, the assembled split nut 238 may be attached to the frame 216 such that the nut and frame move in unison (although there may be some accommodation of relative motion to avoid pressing or binding of the nut against the drive screw during operation). In some embodiments, attachment of the split nut 238 to the frame is accommodated by first assembling the two halves 239, 240 as described above, and placing the assembled split nut 238 into a receiver 217 formed on the frame 216. The receiver 217 may include a shaped flange 219 configured to engage a circumferential groove 244 formed on one or more sides of the split nut when the latter is received in the receiver. That is to say, the assembled driven member/nut 238 may be received by or otherwise joined to the frame 216 by sliding the nut, in the direction 246 shown in FIG. 8, until the flange 219 is received in the grooves 244. Engagement of the flange 219 with the grooves 244 may generally constrain rotation of the nut 238 relative to the frame 216, as well as limit most translation of the nut in all but the direction 247.

During assembly, the split nut 238 may be placed about the drive screw 234, wherein the internal thread 248 of the nut threadably receives a male (external) helical thread 249 formed on the exterior surface of the drive screw (see FIG. 7). As one can thus appreciate, rotation of the drive screw 234 (via the motor 237) may cause the nut 238 (and thus the frame 216) to move upwardly and downwardly. As the cutting blade assembly 208 is operatively attached to the frame 216, the height of cut may thus be effectively adjusted by rotation of the drive screw 234.

As further shown in FIG. 7, the drive screw 234 may include a flange 250 (e.g., at or near its upper end) that holds one or more targets positioned along an outer surface (e.g., circumference). For example, the flange may include six magnets 252 spaced 60 degrees apart. As shown in FIG. 4, a sensor (e.g., encoder 255) operatively coupled to the controller 120 may be provided and configured to detect passage of the magnets 252 as the drive screw 234 rotates. That is, the targets and sensor, together with the controller 120, may define a HOC sensor system. By sensing passage of the magnets, the sensor 255 may detect or otherwise estimate the height of a cut position of the cutting blade/cutting blade assembly and provide a signal to the controller 120 (see FIG. 3B) indicative of the same. In some embodiments, the sensor may be secured to the cover 202 (see FIG. 4).

In some embodiments, the HOC sensor system may be periodically calibrated to maintain accuracy of height-of-cut estimation. For example, on a periodic basis (e.g., daily, weekly, monthly, or after the expiration of a certain number of operating hours), the controller 120 may command the motor 237 to raise the cutting blade assembly 208/frame 216 to its maximum height of cut. As this occurs, the screw 234 may rotate until the nut 238 eventually reaches an upper stop, at which point the motor 237 will stall. Such stall may be detected by, among other methods, the controller 120 detecting an increase in motor 237 current. Once stall is detected, the controller 120 may terminate current to the motor 237 and set the present drive screw position equal to the mower's maximum height-of-cut. Upon receiving a new height-of-cut command (e.g., directly from the controller 120 or indirectly via a remote computer 117 (see FIG. 3B)), the controller may command the drive screw to rotate to adjust the height-of-cut. Based upon the pitch of the drive screw thread 249, the controller may then estimate a vertical position of the frame 216 by monitoring the passage of the rotating magnets 252.

Figure 10:
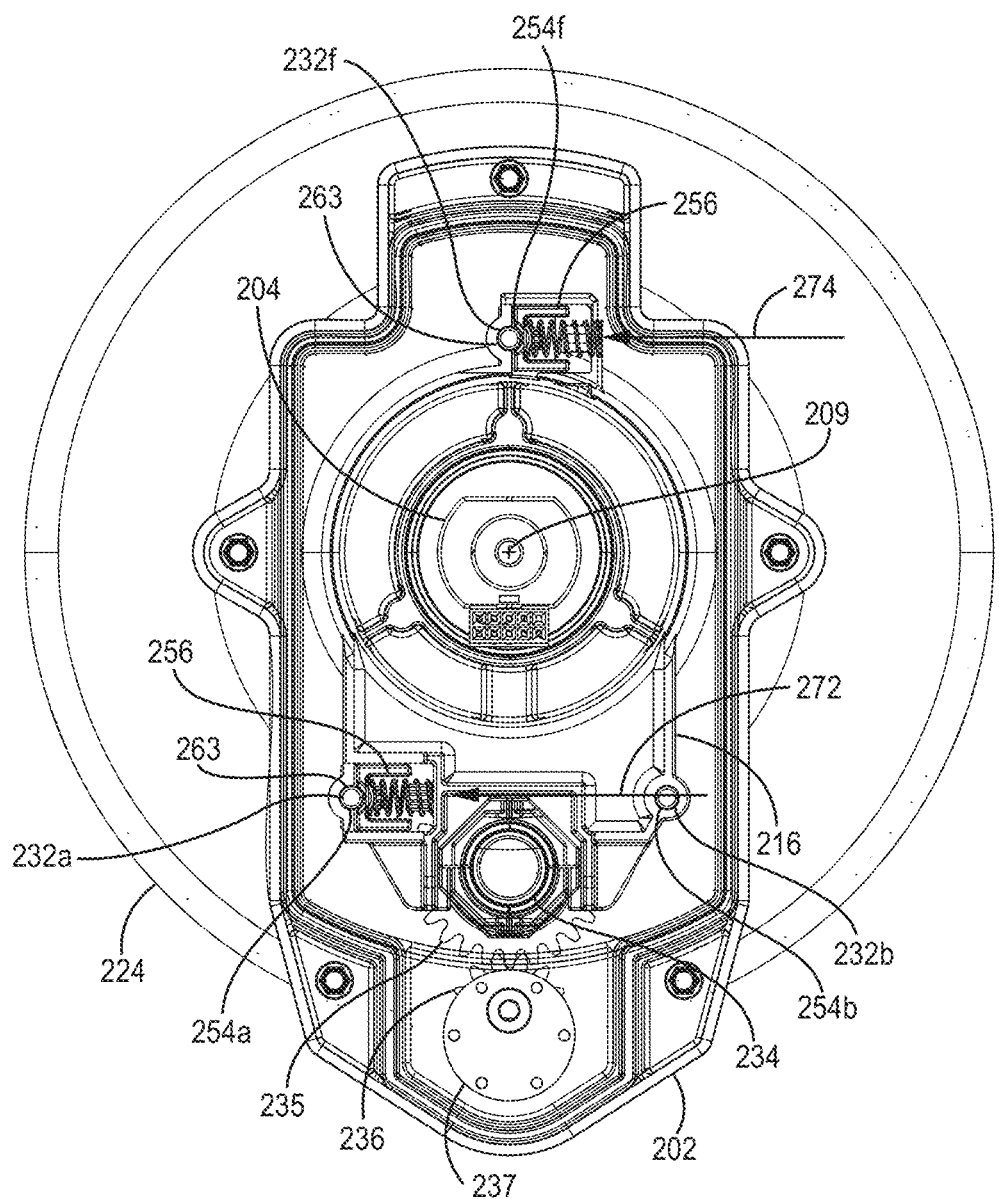
FIG. 10 is a top plan view of HOC control and blade drive systems in accordance with embodiments of the present disclosure (wherein a cover is shown in section to better illustrate aspects of the HOC control and blade drive systems)

As stated above, the guide rods 232 are adapted to be received within corresponding apertures 254 (254a, 254b, 254f) formed in the frame 216 as shown in FIG. 10 to guide movement of the cutting frame during height adjustment of the cutting blade. That is to say, the guide rods 232 may limit movement of the frame 216, relative to the chassis 110, to a generally up and down direction (parallel to the output shaft of the motor 204) wherein the relative position of the frame is proportional to the mower's height of cut.

As one of skill may appreciate, alignment of the guide rods 232 with the corresponding apertures 254 is beneficial to ensuring that the frame 216 moves upwardly and downwardly without excessive force and without binding or chatter during mowing. In some embodiments, smooth operation may be accomplished by tightly controlling tolerances of the size, location, and parallelism of both the guide rods and the apertures. However, providing such tolerances may increase the cost and complexity of manufacture.

Accordingly, embodiments of the present disclosure may be manufactured to less exacting tolerances regarding size, location, and parallelism of the guide rods and the apertures. Rather, smooth operation with minimal binding is instead achieved using one or more biased bearings 256 associated with the frame 216. For example, as shown in FIG. 10, the guide rod 232b and aperture 254b may be configured to provide a close tolerance clearance fit. As used herein, "close tolerance clearance fit" means a clearance of 0.001 inches (in) to 0.005 in (e.g., 0.02 millimeters (mm) to 0.13 mm). As a result, the guide rod 232b/aperture 254b may function as a foundational feature that indexes and positions the frame 216 relative to the chassis 110. Unlike the guide rod 232b/aperture 254b, however, a biased bearing may be associated with the apertures 254a and/or 254f While shown with two biased bearings, such a configuration is not limiting as embodiments including either one or three or more biased bearings are also possible without departing from the scope of this disclosure.

While, in some embodiments, one of the guide rods/apertures (e.g., the guide rod 232b/aperture 254b) is held to a close tolerance clearance fit (i.e., does not utilize a biased bearing as described below) in order to index and accurately position the frame 216, such a configuration is not limiting. That is to say, all the guide rods could be configured with biased bearings as described below without departing from the scope of this disclosure. Moreover, while illustrated with three guide rods, other embodiments may utilize any number of guide rods (e.g., 2, 4, or more).

Figure 11:
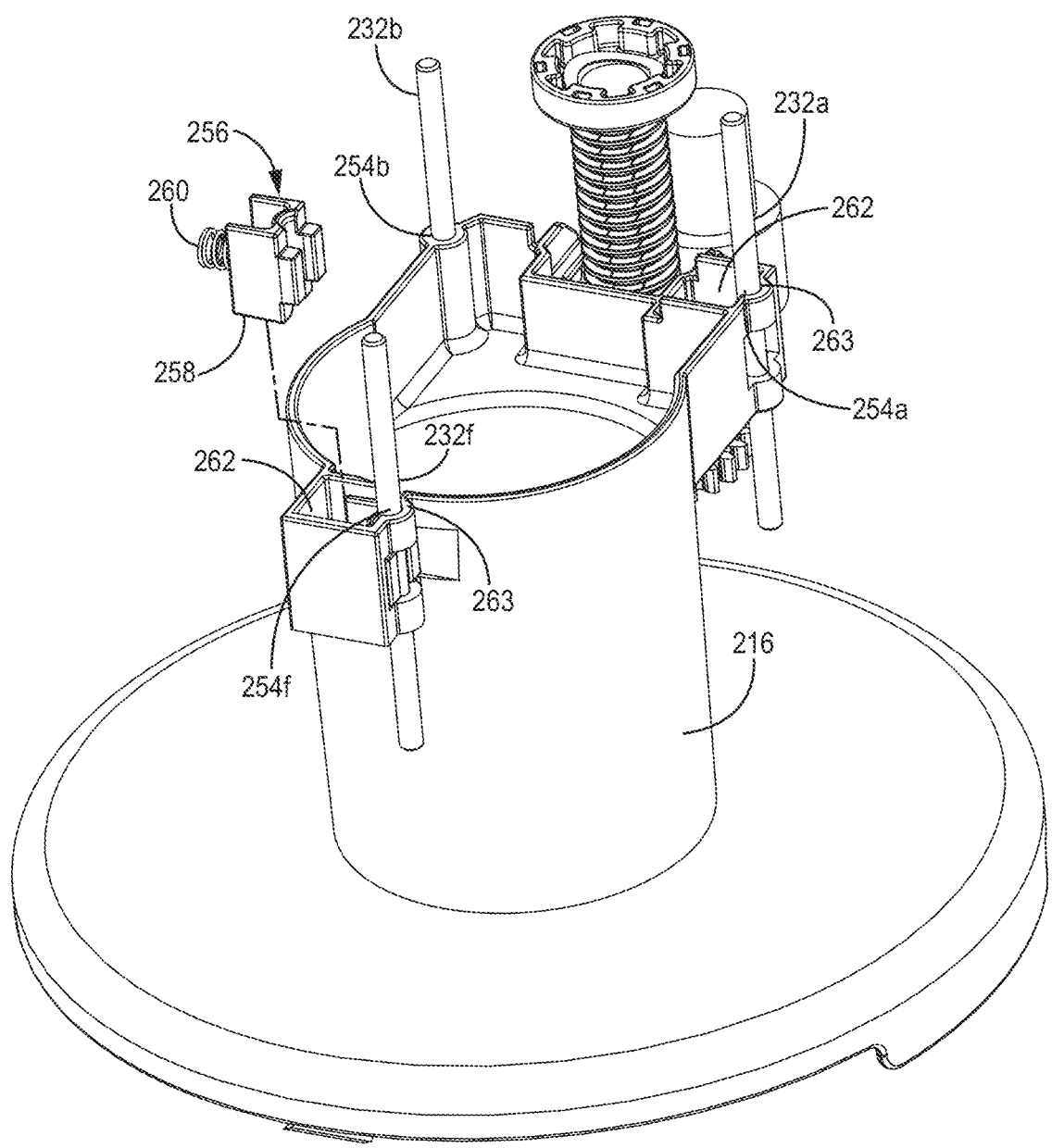
FIG. 11 is a perspective view of the HOC control and blade drive systems of FIG. 10 with a biased bearing of the HOC control system shown exploded from a frame.
Figure 12:
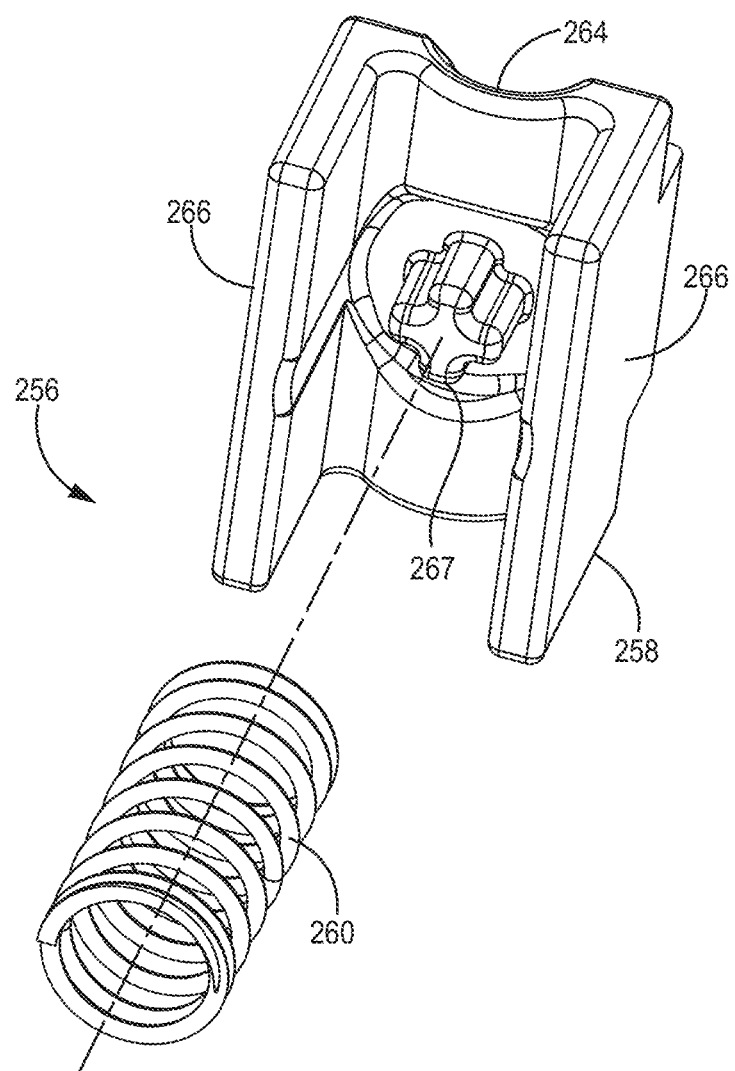
FIG. 12 is a perspective view of the biased bearing of FIG. 11, wherein the biased bearing includes both a bearing member and a biasing member.

FIG. 11 illustrates one of the biased bearings 256 exploded from the frame 216, while FIG. 12 illustrates the same biased bearing with a biasing member (e.g., spring 260) shown separated from a bearing member 258. The biasing member may be associated with the cutting frame 216 and adapted to bias the bearing (e.g., bearing member 258) directly against the associated guide rod 232 by generating a biasing force between the cutting frame and the guide rod (e.g., a first biasing force 272 applied to the rod 232a, and a second biasing force 274 applied to the rod 232f; see FIG. 10).

Each biased bearing 256 may be configured to seat within a pocket 262 formed on the frame 216. Opposite each biased bearing 256, the pocket defines a semi-cylindrical surface 263 corresponding to the outer diameter of the guide rod. Once in place, each bearing member 258 may be biased into contact with its respective guide rod 232 by the spring 260. To achieve this biased contact, each bearing member 258 includes a semi-cylindrical bearing surface 264 (see FIG. 12) that also generally corresponds to the outer diameter of the associated guide rod. Moreover, each bearing member 258 includes contact faces 266 parallel to the direction of the biasing force applied by the spring 260. As a result, when the assembled biased bearing is in the pocket 262, it is limited to moving primarily in a direction that is radial to its associated guide rod, which corresponds to a direction of the biasing force (272, 274) provided by the spring 260. As shown in FIG. 12, the bearing 258 and the frame 216 (e.g., pocket 262) may include protrusions 267 and 268 (see FIG. 13), respectively, that are adapted to prevent the spring 260 from becoming misaligned during operation.

Figure 13:
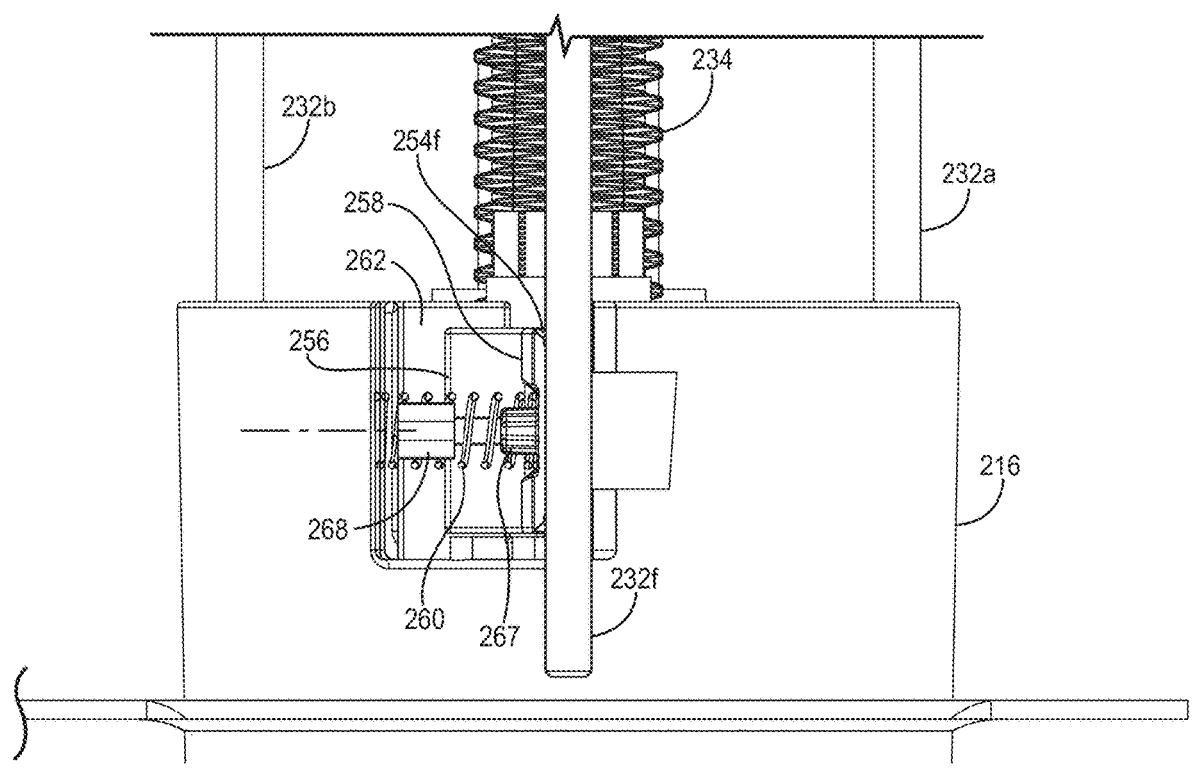
FIG. 13 is a section view taken along line 13-13 of FIG. 7.

With reference to FIGS. 7 and 13, the biased bearings 256 may provide apertures 254a and 254f that are effectively larger than the diameter of the respective guide rods 232. As a result, location and parallelism tolerances of the guide rods and apertures 254 may be relaxed as the biased bearings may now compensate for such tolerance variability while still providing effective clamping against the respective rods. As a result, movement of the cutting frame 216 in the up-and-down direction may occur smoothly and with little or no binding. However, other movements of the frame 216 (e.g., rotational and lateral and longitudinal (fore-and-aft) movements) are effectively reduced or eliminated. By reducing this free play, the cutting blade assembly may operate effectively (e.g., without chattering) even when cutting relatively high grass.

Figure 14:
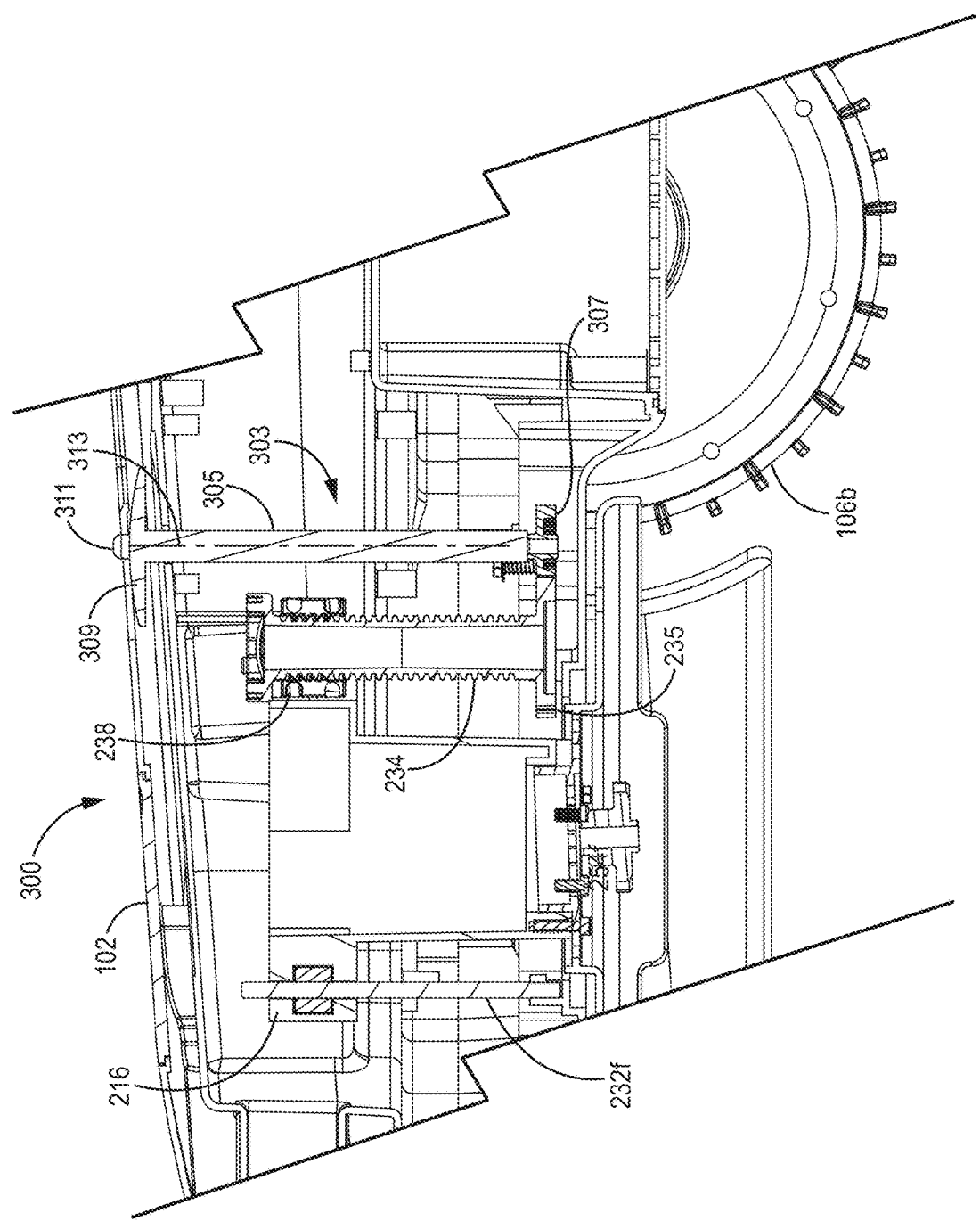
FIG. 14 is a partial section view taken longitudinally through the lawn mower and illustrating a HOC control system in accordance with another embodiment of the disclosure.

While described above as utilizing a powered or automatic HOC control system (using the HOC motor 237), such a configuration is not limiting. For example, embodiments in which the mower operator may manually adjust the height-of-cut are also contemplated. FIG. 14 illustrates an exemplary embodiment of such a manual height adjustment (HOC) system (view shown as a longitudinal section view through the mower). In general, the mower 300 may be similar to the mower 100 already described herein and, as a result, like reference numerals are used where appropriate. For example, the mower 300 may include a tool control system that includes a tool drive system (not shown) and a tool HOC control system 303. The HOC control system 303 may be similar in most ways to the HOC control system 203 already described herein. For instance, it may include a drive screw 234 that drives a split nut 238 attached to the cutting frame 216.

The HOC control system 303 differs, however, in that it eliminates the HOC motor 237 (see FIG. 4). In its place, the control system 303 may include a manual turn screw 305 having a pinion gear 307 in meshing engagement with the gear 235 of the drive screw 234. The turn screw 305 may extend parallel to an axis of the drive screw 234 upwardly through the housing 102 as shown in FIG. 14. A knob 309 may be attached or otherwise affixed to an upper end of the turn screw 305 such that rotate of the knob 309 causes rotation of the turn screw and, correspondingly, the pinion gear 307. As the pinion gear 307 is in meshing engagement with the gear 235 of the drive screw 234, rotation of the knob 309 operatively results in rotation of the drive screw. For the same reasons already set forth herein, such drive screw rotation may proportionally adjust the height-of-cut by displacing the cutting frame 216 (via the split nut 238) upwardly or downwardly.

Figure 15:
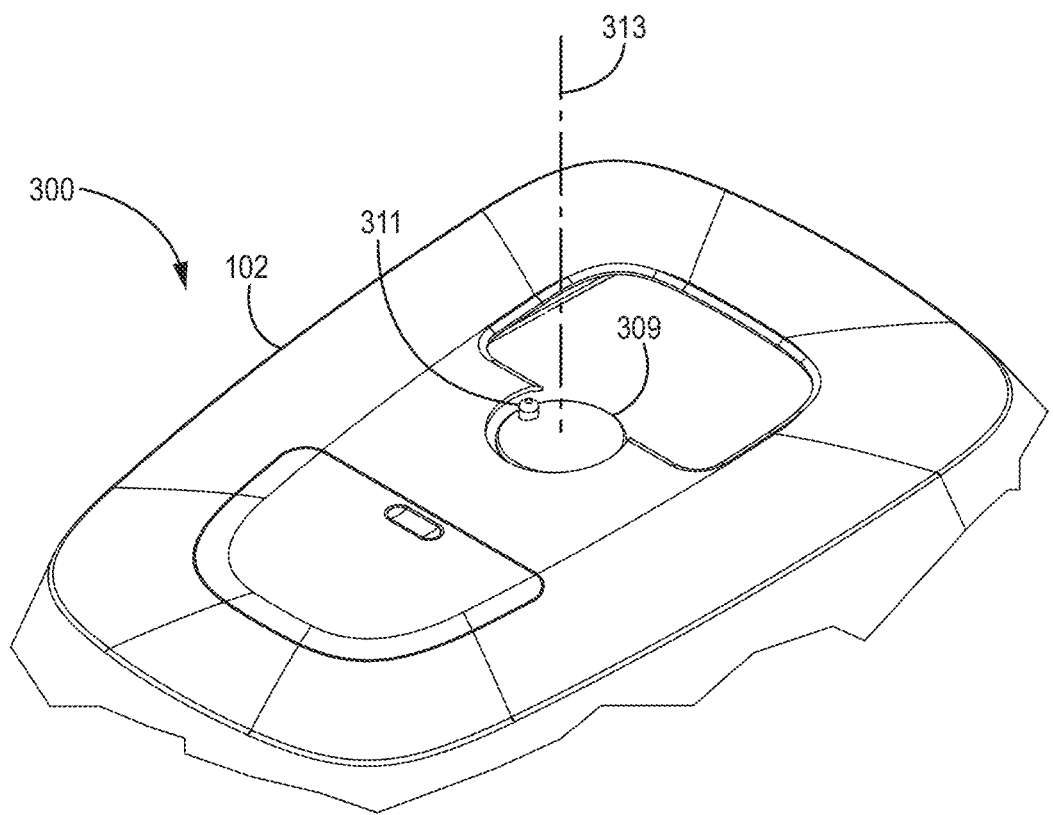
FIG. 15 is a partial top perspective view of the mower in FIG. 14 illustrating a manually controlled turn screw of the HOC control system.

As shown in FIG. 15, the knob 309 may protrude outside and above the housing 102 so that it is accessible to the operator as needed. In some embodiments, the knob 309 may include a crank 311 offset from an axis 313 of the turn screw 305 to provide a more convenient gripping surface for rotation of the knob 309. In some embodiments, the crank 311 may fold or telescope outwardly from the knob when needed and otherwise collapse. Yet other embodiments may forgo the crank altogether in lieu of some other type of easily gripped knob surface, e.g., knurls, spokes, depressions, etc.

While shown as extending upwardly through a top of the housing 102, the knob 309 of the turn screw 305 could alternatively extend through one of the sides of the housing. In such a case, the HOC control system 303 might require additional elements (e.g., bevel gears, shafts, etc.) to convert rotation of the knob to rotation of the drive screw 234.

Maintaining accurate positioning of the cutting frame 216 during operation is beneficial for a number of reasons. For example, maintaining the cutting frame position 216 as described herein such that minimal rotational, lateral, or longitudinal movement occurs may reduce or even prevent radial loading or pressing of the nut 238 against the drive screw 234 (which could result in binding). In fact, in some embodiments, clearances between the nut 238 and the frame 216 are greater than the corresponding tolerance stack-ups controlling cutting frame location. As a result, any unintended movement of the frame 216 (other than the primary up-and-down motion) attributable to parts tolerances that may result in forcing of the nut 238 in a radial direction will not cause the nut to load against the drive screw. That is to say, the nut 238 is not inadvertently biased into contact with the screw 234.

Components of the various embodiments described herein may be constructed of most any acceptable material. For example, the frame 216 may be injection-molded plastic, while the bearing members 258 may be acetal plastic (e.g., available as Delrin brand acetal homopolymer resin distributed by E. I. du Pont de Nemours and Company of Wilmington, Del., USA) and the guide rods 232 may be steel.

Other materials, e.g., carbon fiber, ceramic, and rubber may also be utilized where appropriate without departing from the scope of this disclosure.

During autonomous operation of the mower 100, the controller 120 (see FIG. 3B) may control rotation of the drive screw 234 and thus adjust the height-of-cut of the cutting blades 210/cutting blade assembly 208 relative to the ground surface 101 in response to a signal received by the controller. For example, the signal could be generated by a sensor 114 (diagrammatically illustrated in FIG. 3B) in communication with the controller 120. The sensor 114 may, in some embodiments, be selected from a grass height sensor, a moisture sensor, and a cutting motor load (e.g., current) sensor. The controller 120 may, upon receipt of the signal, automatically increase or decrease the height-of-cut (e.g., control rotation of the drive screw) to ensure effective cutting quality. In other embodiments, the signal may be a command issued by an operator, e.g., received via the radio 111 from a remote computer 117 (such as a mobile phone or tablet), or provided directly via an input panel located on the mower itself. That is to say, the operator may manually input the desired height-of-cut, after which the controller 120 will command the HOC control system to provide the desired height. In other embodiments, the controller 120 could receive a signal representative of a calendar date and then automatically adjust the height-of-cut to better complement the particular mowing season, e.g., a lower height of cut may be automatically selected during autumn.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. An autonomous ground working vehicle comprising:
a chassis;
two or more wheels supporting the chassis upon a ground surface;
a tool motor adapted to power at least one ground working tool, the tool motor driving an output shaft defining a motor axis extending along a first direction;
a frame operatively supporting the tool relative to the chassis, wherein the frame is movable, relative to the chassis, to allow adjustment of a height of the tool relative to the ground surface;
parallel first and second guide rods operatively attached to the chassis and extending parallel to the first direction, wherein the first and second guide rods are received within corresponding first and second apertures of the frame to guide movement of the frame during height adjustment of the tool;
a rotatable drive screw operatively connected to the chassis and defining a screw axis extending parallel to the first direction, the drive screw comprising a helical external thread;
a driven member operatively connected to the frame and comprising a helical internal thread adapted to threadably receive the external thread of the drive screw; and
a biasing member associated with the frame and adapted to bias a bearing associated with the frame directly against the first guide rod.

2. The vehicle according to claim 1, wherein the biasing member comprises a first spring, and wherein the vehicle comprises a second spring adapted to bias a second bearing associated with the frame directly against the second guide rod.

3. The vehicle according to claim 1, further comprising a height adjustment motor adapted to rotate the drive screw.

4. The vehicle according to claim 1, wherein the driven member comprises two semi-cylindrical threaded halves adapted to engage one another to form a cylindrical nut.

5. The vehicle according to claim 1, wherein the driven member is received by the frame.

6. The vehicle according to claim 5, wherein the frame defines a receiver having a flange, the flange adapted to engage a groove formed on one or more sides of the driven member when the driven member is received by the frame.

7. The vehicle according to claim 1, further comprising a third guide rod operatively attached to the chassis and extending parallel to the first direction, wherein the third guide rod is received within a third aperture of the frame.

8. The vehicle according to claim 1, wherein the tool motor is directly supported by the frame.

9. The vehicle according to claim 1, further comprising a height adjustment manual turn screw adapted to rotate the drive screw.

10. An autonomous lawn mower comprising:
a chassis;
two or more wheels supporting the chassis upon a ground surface;
a cutting motor adapted to power a rotating cutting blade, the cutting motor comprising an output shaft defining a motor axis extending vertically;
a cutting frame operatively supporting the cutting motor relative to the chassis, wherein the cutting frame is adapted to move, relative to the chassis, to allow adjustment of a height of the cutting blade relative to the ground surface;
parallel first and second guide rods operatively attached to the chassis and extending vertically, wherein the first and second guide rods are received within corresponding first and second apertures of the cutting frame such that the guide rods guide movement of the cutting frame during adjustment of the height of the cutting blade;
a rotatable drive screw operatively connected to the chassis and defining a screw axis parallel to the first and second guide rods, the drive screw defining an external thread;
a driven member comprising an internal thread adapted to threadably engage the external thread of the drive screw, wherein the driven member is operatively attached to the cutting frame; and
a first spring-biased bearing associated with the cutting frame and biased against the first guide rod, wherein the first spring-biased bearing is adapted to generate a first biasing force between the cutting frame and the first guide rod.

11. The mower according to claim 10, further comprising a second spring-biased bearing associated with the cutting frame and biased against the second guide rod, wherein the second spring-biased bearing is adapted to generate a second biasing force between the cutting frame and the second guide rod.

12. The mower according to claim 10, further comprising a height-of-cut (HOC) motor adapted to selectively rotate the drive screw.

13. The mower according to claim 12, wherein the HOC motor is attached to the chassis and comprises a pinion gear adapted to engage a driven gear attached to the drive screw.

14. The mower according to claim 10, further comprising a sensor adapted to detect a height-of-cut position of the cutting blade.

15. The mower according to claim 14, wherein the drive screw comprises one or more targets positioned along an outer surface of the drive screw, and wherein the sensor is adapted to detect passage of the one or more targets.

16. The mower according to claim 10, further comprising a third guide rod operatively attached to the chassis and extending vertically, wherein the third guide rod is received within a third aperture of the cutting frame.

17. The mower according to claim 10, further comprising a controller, wherein the controller is adapted to control rotation of the drive screw to adjust a height-of-cut of the cutting blade relative to the ground surface in response to a signal received by the controller.

18. The mower according to claim 17, wherein the signal comprises a signal from a sensor in communication with the controller.

19. The mower according to claim 18, wherein the sensor comprises a sensor selected from the group consisting of a grass height sensor, a moisture sensor, and a cutting motor load sensor.

20. The mower according to claim 17, wherein the signal comprises a calendar date.

21. The mower according to claim 10, further comprising a controller and a radio, the radio adapted to communicate with a remote computer, wherein the controller is adapted to control rotation of the rotatable drive screw to adjust a height-of-cut of the cutting blade relative to the ground surface in response to the radio receiving a command from the remote computer.

* * * * *